United States Patent
Booth et al.

(10) Patent No.: US 8,160,148 B2
(45) Date of Patent: *Apr. 17, 2012

(54) COMPUTATIONAL REDUCTION IN MOTION ESTIMATION BASED ON LOWER BOUND OF COST FUNCTION

(75) Inventors: Simon Booth, Milton (CA); Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1087 days.

This patent is subject to a terminal disclaimer.

(21) Appl. No.: 12/037,388

(22) Filed: Feb. 26, 2008

(65) Prior Publication Data
US 2008/0212678 A1   Sep. 4, 2008

Related U.S. Application Data

(63) Continuation of application No. 10/732,137, filed on Dec. 10, 2003, now Pat. No. 7,362,809.

(51) Int. Cl.
*H04N 7/12* (2006.01)

(52) U.S. Cl. .......... 375/240.16; 375/240.01; 375/240.12

(58) Field of Classification Search ................... 375/240, 375/240.01, 240.12, 240.16
See application file for complete search history.

(56) References Cited

U.S. PATENT DOCUMENTS

| | | | |
|---|---|---|---|
| 6,404,814 B1 | 6/2002 | Apostolopoulos et al. | 375/240.12 |
| 6,549,576 B1 | 4/2003 | Moriyoshi | 375/240.16 |

*Primary Examiner* — Allen Wong
(74) *Attorney, Agent, or Firm* — Christopher P. Maiorana, PC

(57) ABSTRACT

A method for motion estimation comprising the steps of (A) determining whether a cost of encoding one or more prediction parameters for a current search position is less than a current best cost, (B) when the cost of encoding the one or more prediction parameters for the current search position is less than the current best cost, updating the current best cost if the current best cost is greater than or equal to a sum of the cost for encoding the one or more prediction parameters for the current search position and a distortion measurement for the current search position and (C) ending the search when the current best cost is less than or equal to the cost of encoding the one or more prediction parameters for the current search position and less than a minimum cost for encoding one or more prediction parameters for one or more remaining search positions.

20 Claims, 7 Drawing Sheets

COMPUTATIONAL REDUCTION IN MOTION ESTIMATION BASED ON LOWER BOUND OF COST FUNCTION

CROSS REFERENCE TO RELATED APPLICATIONS

This is a continuation of U.S. Ser. No. 10/732,137, filed Dec. 10, 2003, now patented as U.S. Pat. No. 7,362,809 on Apr. 22, 2008.

This application may be related to application U.S. Ser. No. 10/196,731, filed Jul. 17, 2002, now patented as U.S. Pat. No. 7,072,399 on Jul. 4, 2006, which is hereby incorporated by reference in its entirety.

FIELD OF THE INVENTION

The present invention relates to video compression generally and, more particularly, to a computational reduction in motion estimation based on a lower bound of a cost function.

BACKGROUND OF THE INVENTION

Motion estimation is the most computationally expensive element in a video compression system. In typical video encoding systems, motion estimation uses up to 80% of the computational resources. Motion estimation is performed through a process called block-matching. Block-matching involves comparing a block of pixels in an original picture (for which motion is being estimated) to blocks of pixels at many positions in a reference picture. At each position, a block-matching cost function is evaluated to assess the quality of the block-match. The position that results in the lowest value of the cost function is taken to be the optimal position for motion compensated coding for the original block of pixels.

A solution that reduces the total computation required for motion estimation would be desirable.

SUMMARY OF THE INVENTION

The present invention concerns a method for motion estimation comprising the steps of (A) determining whether a cost of encoding one or more prediction parameters for a current search position is less than a current best cost, (B) when the cost of encoding the one or more prediction parameters for the current search position is less than the current best cost, updating the current best cost if the current best cost is greater than or equal to a sum of the cost for encoding the one or more prediction parameters for the current search position and a distortion measurement for the current search position and (C) ending the search when the current best cost is less than or equal to the cost of encoding the one or more prediction parameters for the current search position and less than a minimum cost for encoding one or more prediction parameters for one or more remaining search positions.

The objects, features and advantages of the present invention include providing a computational reduction in motion estimation based on lower bound of cost function that may (i) take advantage of characteristics of a motion vector cost term of a cost function to reduce the total computation required for motion estimation, (ii) exit a motion estimation loop based on a check of a lower bound of one term of the cost function being optimized, (iii) eliminate unnecessary computations, (iv) reduce computational expense in block-matching motion estimation and/or (v) have little or no impact on motion estimation results.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally facilitates a decision to exit a motion estimation loop based on a check against a lower bound of one term of a cost function to be optimized. By exiting the motion estimation loop early, the present invention generally reduces or avoids unnecessary computations. Although the present invention generally reduces computational expense in block-matching motion estimation through an early exit from the motion estimation loop, the motion estimation results provided by the present invention are generally not impacted.

Figure 1:
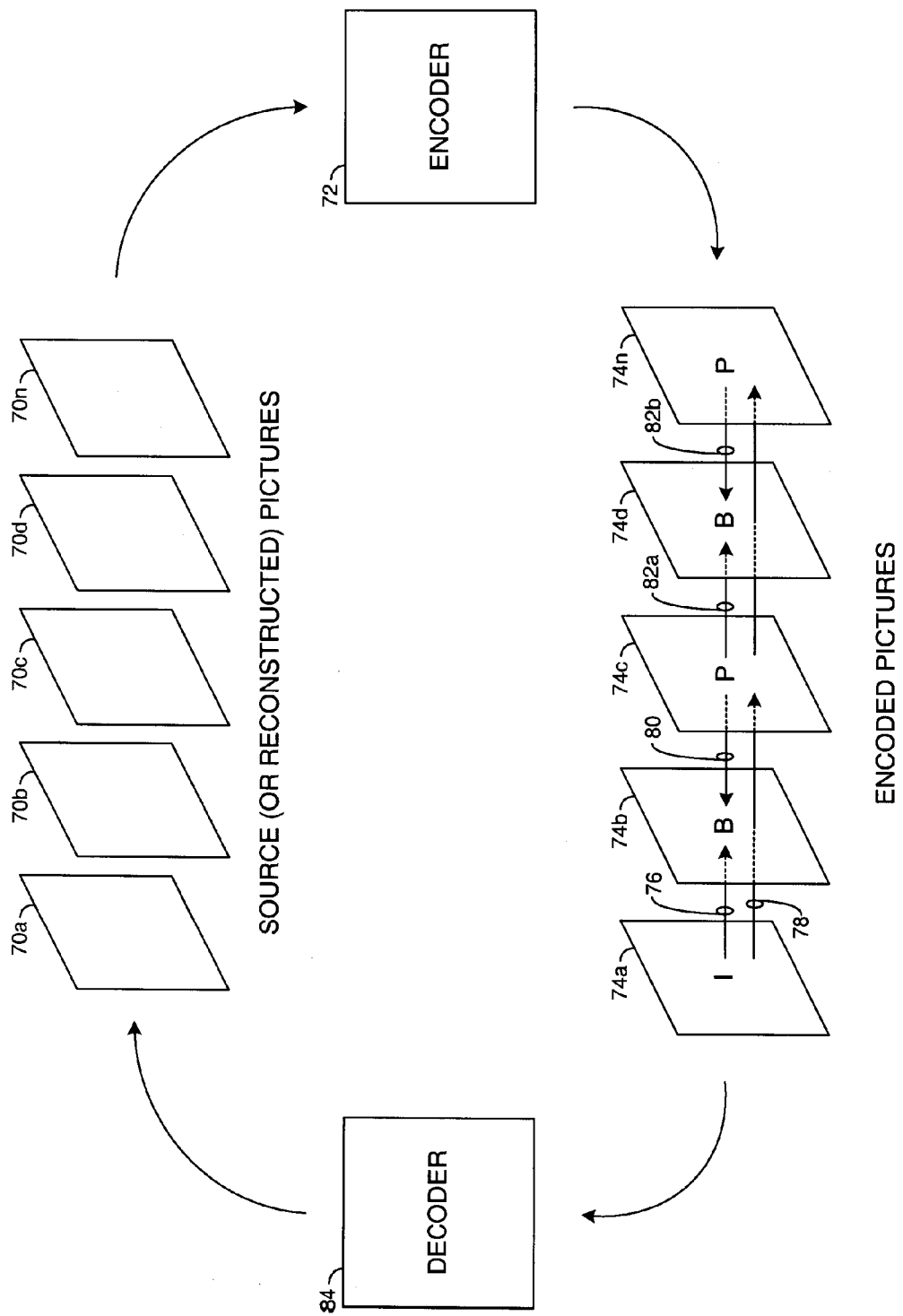
FIG. 1 is a block diagram illustrating encoding and decoding operations.

Referring to FIG. 1, a block diagram is shown illustrating encoding and decoding operations. In general, a data stream (e.g., a video stream) may comprise a series of source pictures 70a-n. The source pictures may also be referred to as images, frames, a group-of-pictures (GOP) or a sequence. The pictures generally comprise contiguous rectangular arrays of pixels (i.e., picture elements) or samples. Compression of video without significant quality degradation is usually possible because video sequences contain a high degree of: 1) spatial redundancy, due to the correlation between neighboring pixels, 2) spectral redundancy, due to correlation among the color components, 3) temporal redundancy, due to correlation between video frames, and 4) psycho-visual redundancy, due to properties of the human visual system (HVS).

Video frames generally comprise three rectangular matrices of pixel (or sample) data representing a luminance signal (e.g., luma Y) and two chrominance signals (e.g., chroma Cb and Cr) that correspond to a decomposed representation of the three primary colors (e.g., Red, Green and Blue) associated with each picture element. The most common format used in video compression standards is eight bits and 4:2:0 sub-sampling (e.g., the two chroma components are reduced to one-half the vertical and horizontal resolution of the luma component). However, other formats may be implemented to meet the design criteria of a particular application.

Each picture may comprise a complete frame of video (e.g., a frame picture) or one of two interlaced fields from an interlaced source (e.g., a field picture). The field picture generally does not have any blank lines between the active lines of pixels. For example, if the field picture is viewed on a normal display, the field picture would appear short and fat. For interlaced sequences, the two fields may be encoded together as a frame picture. Alternatively, the two fields may be encoded separately as two field pictures. Both frame pictures and field pictures may be used together in a single interlaced sequence. High detail and limited motion generally favors frame picture encoding. In general, field pictures occur in pairs (e.g., top/bottom, odd/even, field1/field2). The output of a decoding process for an interlaced sequence is generally a series of reconstructed fields. For progressive scanned sequences, all pictures in the sequence are frame pictures. The output of a decoding process for a progressive sequence is generally a series of reconstructed frames.

The source pictures 70a-n may be presented to an encoder 72. The encoder 72 may be configured to generate a series of encoded pictures 74a-n in response to the source pictures 70a-n, respectively. For example, the encoder 72 may be configured to generate the encoded pictures 74a-n using a compression standard (e.g., MPEG-2, MPEG-4, H.264, etc.). In general, encoded pictures may be classified as intra coded pictures (I), predicted pictures (P) and bi-predictive pictures (B). Intra coded pictures are generally coded without temporal prediction. Rather, intra coded pictures use spatial prediction within the same picture. For example, an intra coded picture is generally coded using information within the corresponding source picture (e.g., compression using spatial redundancy). An intra coded picture is generally used to provide a receiver with a starting point or reference for prediction. In one example, intra coded pictures may be used after a channel change and to recover from errors.

Predicted pictures (e.g., P-pictures or P-frames) and bi-predictive pictures (e.g., B-pictures or B-frames) may be referred to as inter coded. Inter coding techniques are generally applied for motion estimation and/or motion compensation (e.g., compression using temporal redundancy). P-pictures and B-pictures may be coded with forward prediction from references comprising previous I and P pictures. For example, the B-picture 74b and the P-picture 74c may be predicted using the I-picture 74a (e.g., as indicated by the arrows 76 and 78, respectively). The B-pictures may also be coded with (i) backward prediction from a next I or P-reference picture (e.g., the arrow 80) or (ii) interpolated prediction from both past and future I or P-references (e.g., the arrows 82a and 82b, respectively). However, portions of P and B-pictures may also be intra coded or skipped (e.g., not sent at all). When a portion of a picture is skipped, the decoder generally uses the associated reference picture to reconstruct the skipped portion with no error.

However, the concept of what particular pictures may reference what other particular pictures may be generalized in a particular compression standard (e.g., H.264). For example, P-pictures may reference temporally forward or backward. B-pictures may have similar forward or backward references. The restriction is generally not time, but rather how many frames are stored in a buffer so that the frames may be decoded in a different order than the frames are displayed. In one example, the frames may be referenced forward in time. In another example, the frames may be referenced backward in time (e.g., re-ordering the frames).

In one example, a B-frame may differ from a P-frame in that a B-frame may do interpolated prediction from any two reference frames. Both reference frames may be (i) forward in time, (ii) backward in time, or (iii) one in each direction. B-pictures can be, and are expected to often be, used as prediction references in H.264.

The encoded pictures 74a-n may be presented to a decoder 84. The decoder 84 is generally configured to generate a series of reconstructed pictures corresponding to the source pictures 70a-70n (e.g., images, frames, fields, etc.) in response to the encoded pictures. In one example, the decoder 84 may be implemented within the encoder 72 and the reconstructed pictures may be used in the prediction operations of the encoding process.

Figure 2:
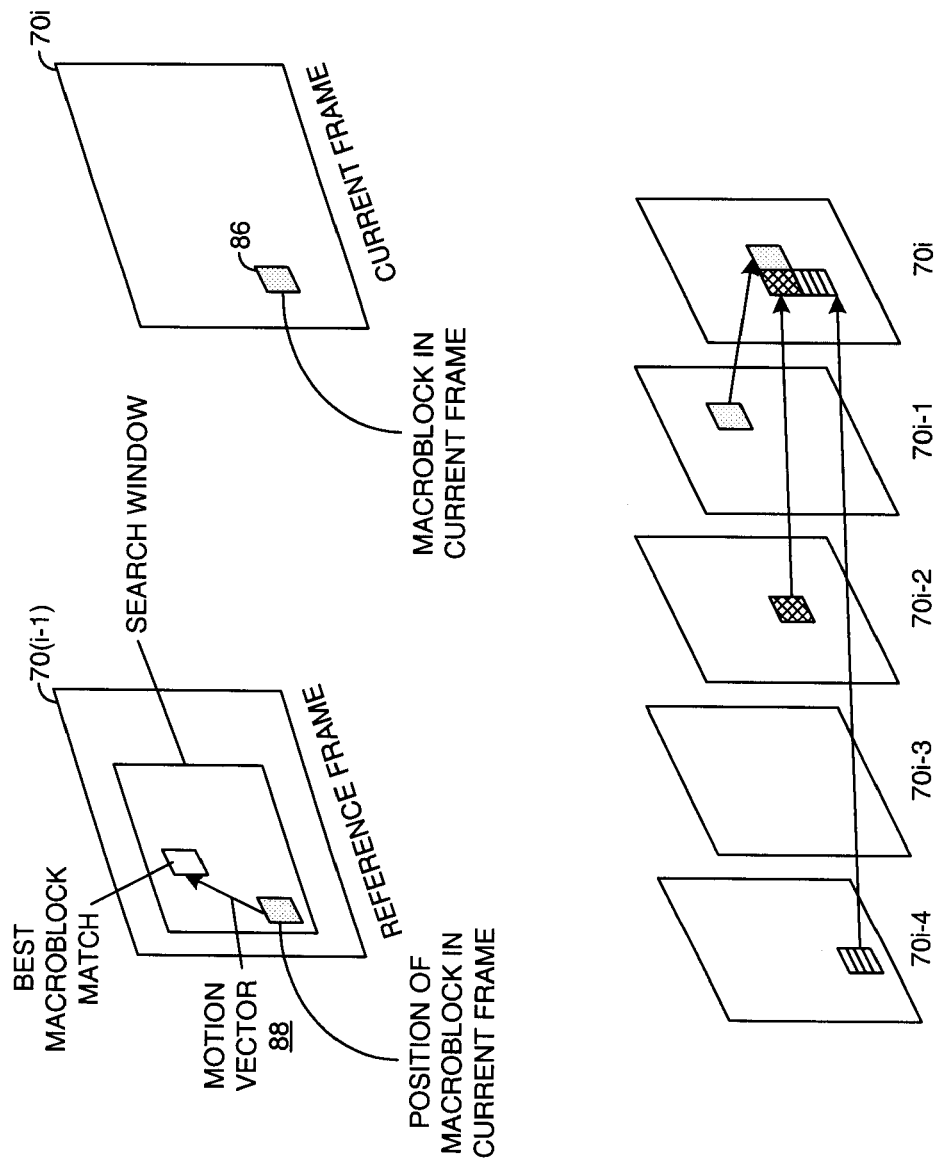
FIG. 2 is a block diagram illustrating example prediction operations.

Referring to FIG. 2, a block diagram is shown illustrating example prediction operations. A picture (or video frame) 70i may be divided into a number of macroblocks 86 of equal size. In one example, the macroblocks 86 may be implemented as 16×16 pixels. For example, with 4:2:0 format, the macroblock 86 may comprise a 16×16 array of luma samples, an 8×8 array of blue chroma (Cb) samples and an 8×8 array of red chroma (Cr) samples. However, other size macroblocks may be implemented to meet the design criteria of a particular application. Motion compensated prediction generally presumes that a macroblock within the current picture 70i may be modeled as a translation of a macroblock from a previous picture 70(i-1). Each macroblock 86 in the current picture 70i is generally predicted from the previous picture 70(i-1). The motion information is generally represented as a two-dimensional displacement vector or motion vector 88. Due to the block-based picture representation, motion estimation generally uses block-matching techniques that obtain the motion vector by minimizing a cost function measuring the mismatch between a candidate block and the current block. For example, the current block may be compared with a number of candidate block in a search window in the reference frame. In one example, a number of previous (or reference) pictures 70(i-4), 70(i-3) . . . 70(i-1) may be used to predict the macroblocks in the current picture 70i.

Figure 3:
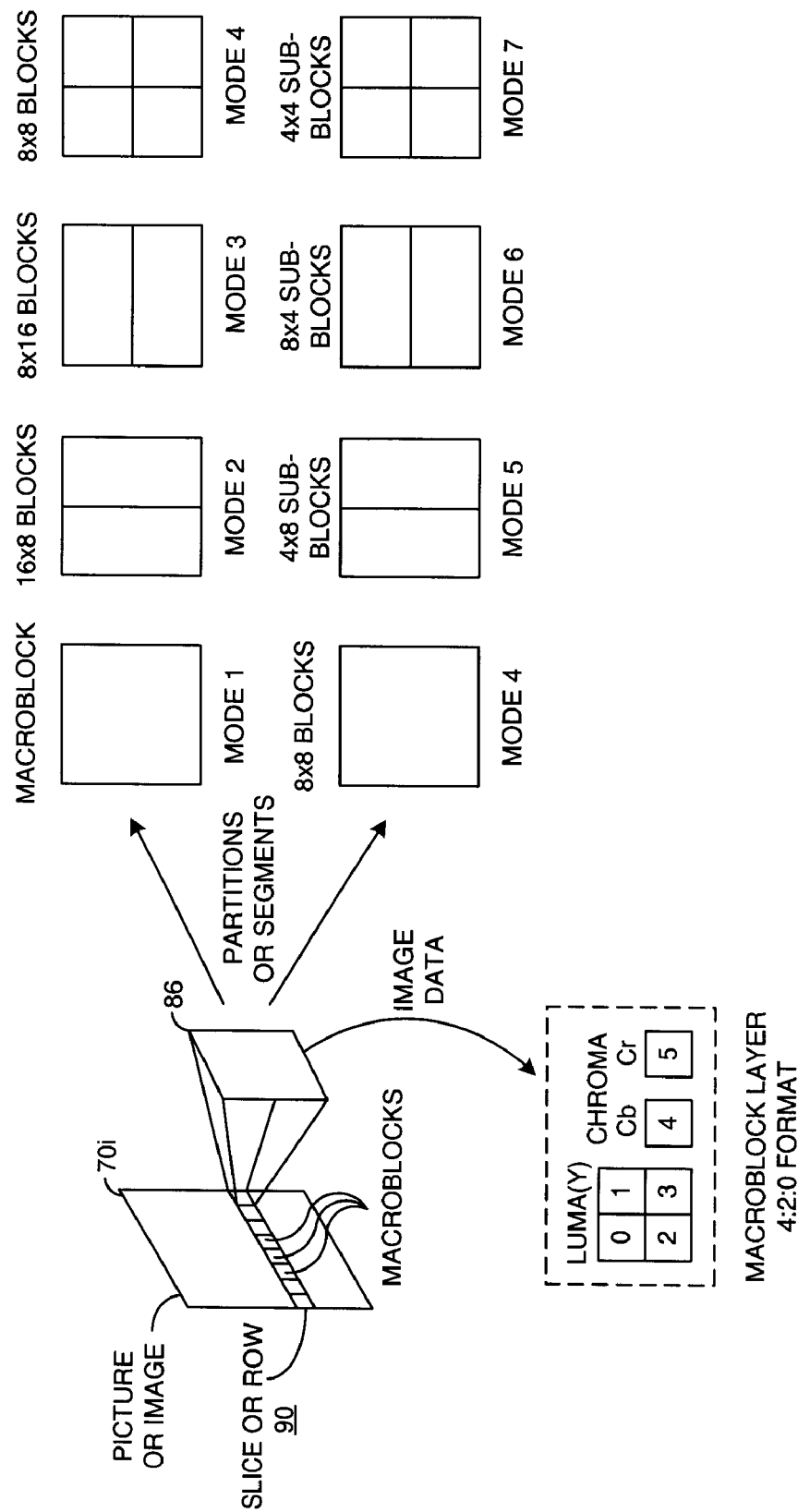
FIG. 3 is a block diagram illustrating partitions or segments of pictures.

Referring to FIG. 3, a block diagram is shown generally illustrating partitions or segments of pictures. In general, a picture (e.g., an image, a frame, a field, etc.) 70i may be divided (e.g., segmented, partitioned, etc.) into a number of macroblocks 86. The macroblocks generally comprise an array of pixels (or samples) having vertical and horizontal dimensions of equal size (e.g., 32×32, 16×16, etc). However, other dimensions may be implemented accordingly to meet the design criteria of a particular implementation. For example, a macroblock may be implemented as an N×M array, where N and M are the same or different integers. The macroblocks generally comprise luminance data (e.g., luma Y) and chrominance data (e.g., blue chroma Cb and red chroma Cr). In one example, the luminance data may have a resolution that is twice that of the chrominance data (e.g., a 4:2:0 format). In general, the size of a macroblock is stated as the luminance sample resolution with the chrominance resolution implied by the particular video format (e.g., 4:2:0, 4:2:1, 4:1:1, etc.).

The macroblocks 86 may be grouped in a number of slices 90. The slices 90 may comprise an arbitrary number of macroblocks 86. The slices 90 generally run from left to right and may comprise an entire row of the picture 70i. However, a slice 90 may comprise less than or more than an entire row of macroblocks 86 (e.g., H.264 compliant). In one example, a slice 90 may be defined as a particular number of macroblocks 86 grouped together. For broadcast profiles, the macroblocks 86 in a slice 90 are generally consecutive macroblocks in raster scan order. However, for streaming and/or video-conferencing applications, a map may be sent identifying which scattered macroblocks are grouped together in a slice. A compression standard (e.g., H.264) may also provide an option of using macroblocks or macroblock pairs. A macroblock pair comprises two macroblocks located one above the other. When macroblock pairs are used, a slice or row generally comprises macroblock pairs rather than macroblocks.

In one example, the macroblock 86 may be implemented as a 16×16 block. The macroblock 86 may be encoded in an inter prediction mode (e.g., compression based upon temporal redundancy) or an intra prediction mode (e.g., compression based upon spatial redundancy). In the inter prediction mode, each 16×16 macroblock 86 may be predicted with a single 16×16 vector (e.g., mode 1). Alternatively, the macroblock 86 may be segmented into two 16×8 blocks (e.g., mode 2) or two 8×16 blocks (e.g., mode 3), in which case two motion vectors may be generated for predicting the macroblock 86. The macroblock 86 may also be segmented into four 8×8 blocks (e.g., mode 4), in which case four motion vectors may be generated for the macroblock 86. When the macroblock 86 is segmented into the four 8×8 blocks (e.g., mode 4), each 8×8 block may be optionally further segmented into two 4×8 sub-blocks (e.g., mode 5), two 8×4 sub-blocks (e.g., mode 6) or four 4×4 sub-blocks (e.g., mode 7). An encoder generally decides which "mode" to use for encoding each macroblock 86. For example, an error score may be computed based on a closeness of match determination for each mode, with the modes that use more vectors being penalized (e.g., by increasing the respective error score) because of the additional bits that it will take to encode the motion vectors.

For chrominance (or chroma) samples, the prediction block is generally formed for the entire 8×8 chroma block. Both chroma Cb and chroma Cr blocks are generally processed similarly. In intra-predicted macroblocks, one of four prediction modes may be used (e.g., DC or mode 0, vertical or mode 1, horizontal or mode 2, and plane or mode 3). For inter-predicted macroblocks, the chroma may be predicted from the chroma samples of the appropriate reference picture. For example, for a 16×16 luma motion compensated block that is predicted from a particular position of the luma plane in a reference picture, the corresponding 8×8 chroma blocks may be predicted from the equivalent position in the corresponding chroma planes of the same reference picture. In general, the chroma position is scaled according to the relative resolutions of the luminance and chroma planes.

Figure 4:
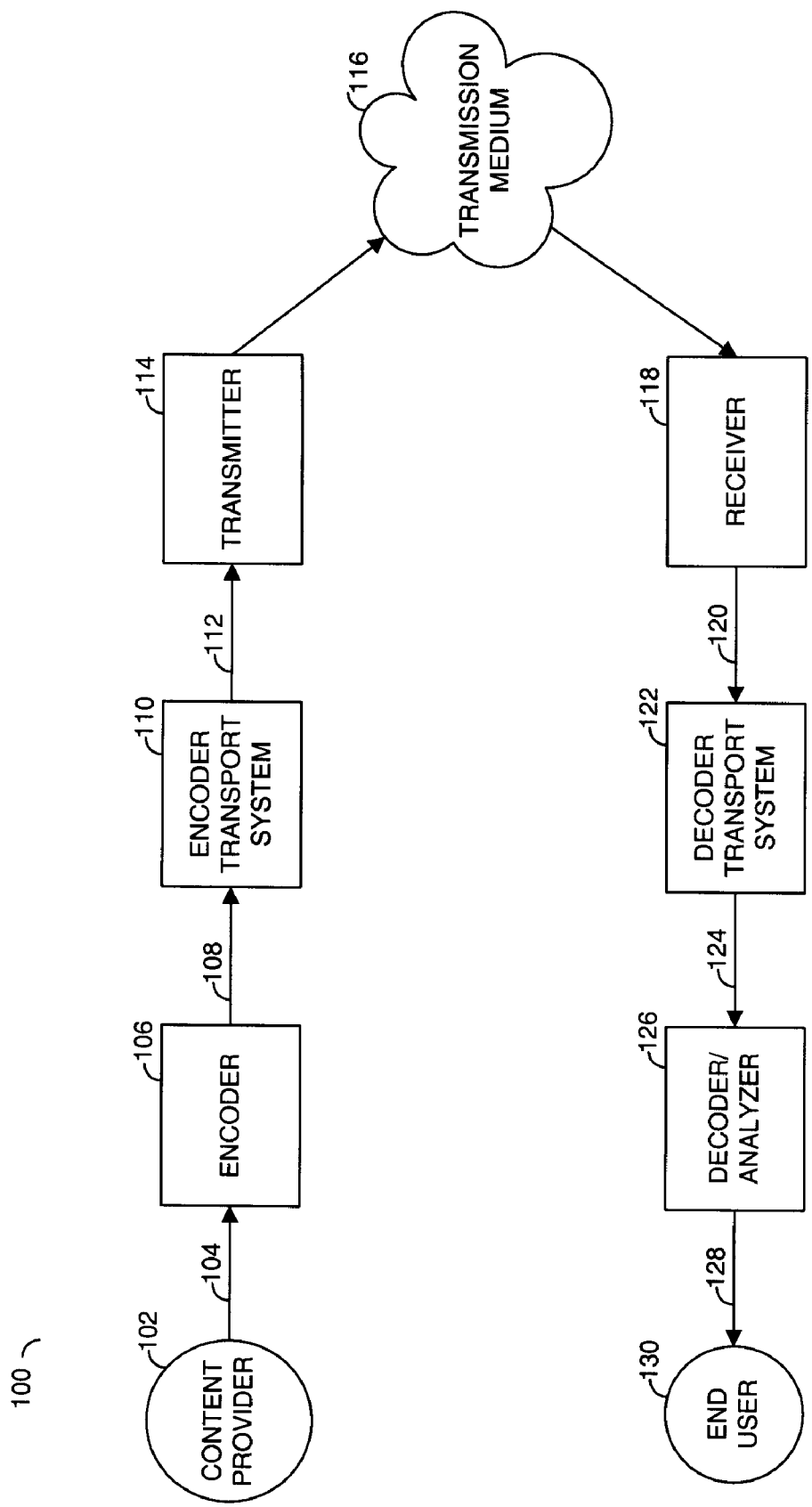
FIG. 4 is a block diagram illustrating various components of a compressed video system.

Referring to FIG. 4, a block diagram of a system 100 is shown. In general, a content provider 102 presents video image, audio or other data 104 to be compressed and transmitted to an input of an encoder 106. The encoder 106 may comprise a H.264/MPE4-AVC encoder. In one example, the encoder 106 may be configured to perform motion estimation in accordance with a preferred embodiment of the present invention. The compressed data 108 from the encoder 106 may be presented to an encoder transport system 110. An output of the encoder transport system 110 generally presents a signal 112 to a transmitter 114. The transmitter 114 transmits the compressed data via a transmission medium 116. The content provider 102 may comprise a video broadcast, DVD, or any other source of video data stream. The transmission medium 116 may comprise a broadcast, cable, satellite, network, DVD, hard drive, or any other medium implemented to carry, transfer, and/or store a compressed bitstream.

On a receiving side of the system 100, a receiver 118 generally receives the compressed data bitstream from the transmission medium 116. The receiver 118 presents a bitstream 120 to a decoder transport system 122. The decoder transport system 122 generally presents the bitstream via a link 124 to a decoder 126. The decoder 126 may comprise a H.264/MPEG4-AVC compliant decoder. The decoder 126 generally decompresses the data bitstream and presents the data via a link 128 to an end user 130. The end user 130 may comprise a television, monitor, computer, projector, hard drive, or any other medium implemented to carry, transfer, present, display and/or store an uncompressed bitstream.

Figure 5:
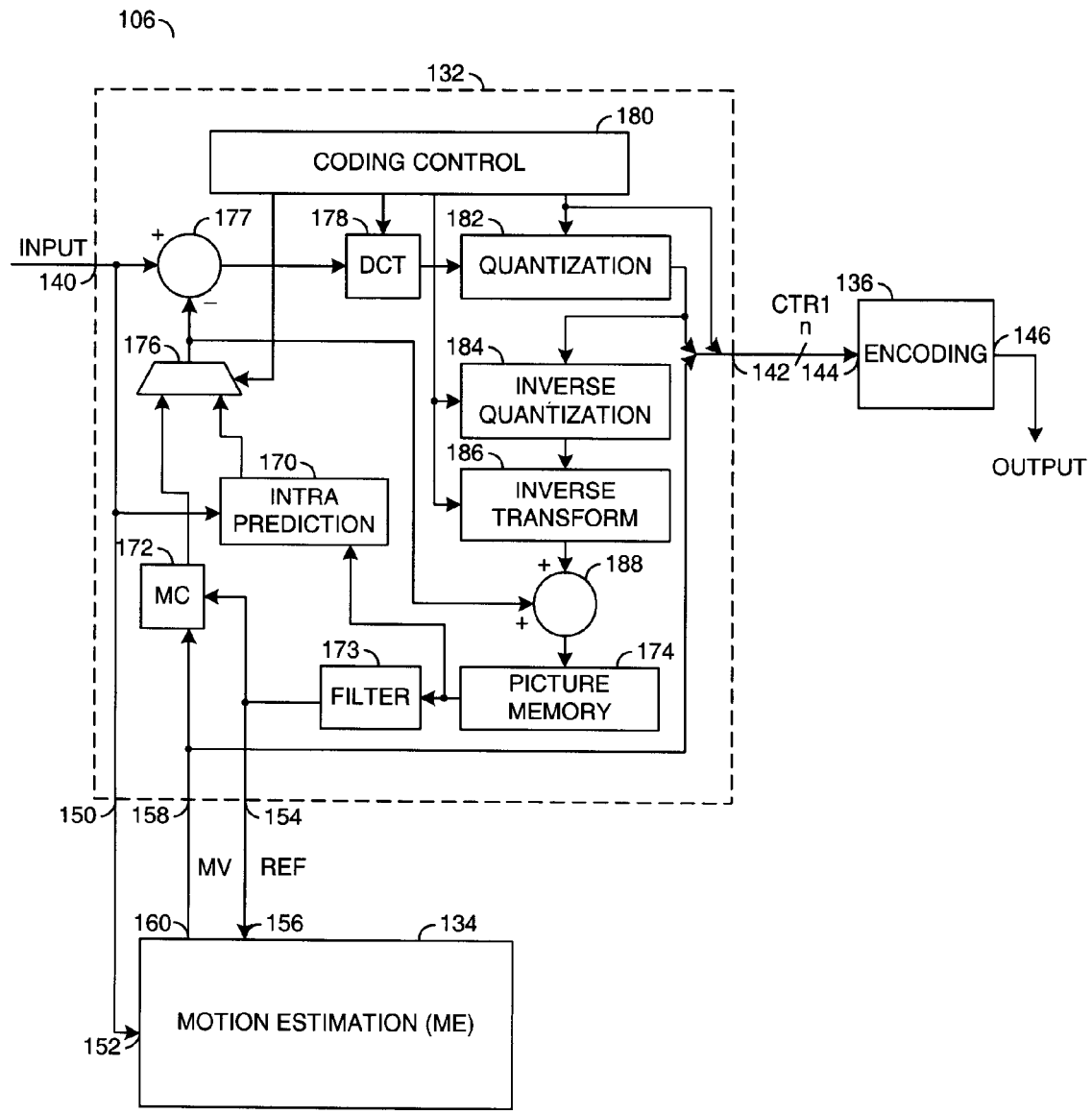
FIG. 5 is a block diagram of an encoder of FIG. 4.

Referring to FIG. 5, a more detailed block diagram illustrating an encoder 106 in accordance with a preferred embodiment of the present invention is shown. The encoder 106 may be implemented, in one example, as an H.264/MPEG4-AVC (also referred to as MPEG4-Part 10) compliant encoder. The encoder 106 generally comprises a processing block 132 and a processing block 134. The encoder 106 may also comprise an encoding block 136. The processing block 132 may be implemented as a general processing block. The processing block 134 may be implemented as a motion estimation (ME) block. In one example, the block 134 may be configured to reduce computational expenses associated with block-matching motion estimation, while not impacting the motion estimation results.

The general processing block 132 may have an input 140 that may receive a signal (e.g., INPUT). The signal INPUT may comprise an uncompressed digital video signal comprising a series of pictures (e.g., frames, fields, etc.). Each picture generally comprises a representation of a video signal at a particular time. The general processing block 132 may be configured to generate a plurality of macroblocks from each picture. The general processing block 132 may also have an output 142 that may present one or more signals (e.g., CTR1) to an input 144 of the encoding circuit 136.

The encoding circuit 136 may have an output 146 that may present a signal (e.g., OUTPUT). The signal OUTPUT may be a compressed and/or encoded bitstream, such as an H.264 compliant digital video bitstream. In one example, the encoding circuit 136 may be configured to perform entropy coding. The circuit 136 may be further configured to provide serialization (e.g., zig-zag scan) and re-ordering of the transformed and quantized pictures.

The general processing circuit 132 may have an output 150 that may present the signal INPUT to an input 152 of the ME block 134, an output 154 that may present a signal (e.g., REF) to an input 156 of the ME block 134 and an input 158 that may receive a signal (e.g., MV) from an output 160 of the ME block 134. The signal REF may comprise, in one example, previously encoded/decoded and reconstructed samples of the pictures in the signal INPUT. The signal MV may comprise motion vectors and/or reference indices.

The circuit 132 generally comprises a block (or circuit) 170, a block (or circuit) 172, a block (or circuit) 173, a block (or circuit) 174, a block (or circuit) 176, a block (or circuit) 177, a block (or circuit) 178, a block (or circuit) 180, a block (or circuit) 182, a block (or circuit) 184, a block (or circuit) 186 and a block (or circuit) 188. The circuit 170 may be implemented as an intra prediction circuit. The circuit 172 may be implemented as a motion compensation (MC) circuit. The circuit 173 may be implemented as a deblocking (or loop) filter. The circuit 174 may be implemented as a picture memory circuit. The circuit 176 may be implemented as a selection circuit, such as a 2:1 multiplexer. The circuit 177 may be implemented as a summing circuit. The circuit 178 may be implemented as a transform circuit. In one example, the circuit 178 may be configured to perform an 4×4 integer transform or a discrete cosine transform (DCT). The circuit 180 may be implemented as a control circuit. The circuit 182 may be implemented as a quantization circuit. The circuit 184 may be implemented as an inverse quantization circuit. The circuit 186 may be implemented as an inverse transform circuit. The circuit 188 may be implemented as a summing circuit.

An output of the quantization circuit 182 and the signal MV may be presented in the signal CTR1 at the output 142. The signal CTR1 may also comprise, for example, reference information from the motion estimation block 134, information regarding intra prediction modes from the intra prediction block 170, coefficients from the quantization block 182 and/or quantization parameters (QP) from the coding control block 180 (e.g., for controlling quantization step size).

The inverse quantization circuit 184 is generally configured to reverse the quantization process performed by the quantization circuit 182. The inverse transform circuit 186 is generally configured to reverse the transformation process (e.g., DCT or 4×4 integer) performed by the circuit 178. The inverse transform circuit 186 may also be referred to as an inverse DCT block or an IDCT block.

The signal INPUT may be presented to the intra prediction block 170, the motion estimation block 172 and the summing block 177. The summing block 177 may mathematically combine the signal INPUT with either (i) the output of the intra prediction block 170 or (ii) the output of the motion compensation block 172. The selection may respond to a signal provided by the control circuit 180. The signal INPUT may be compressed with the transform circuit 178. The transform circuit 178 may translate the macroblocks in the signal INPUT from time domain frames to frequency domain frames. The quantization block 182 may reduce the number of bits in a number of coefficients representing the signal INPUT. The encoding block 136 may provide, for example, entropy coding (e.g., Huffman coding, binary arithmetic coding, context adaptive binary arithmetic coding or CABAC, etc.) to implement a lossless compression having frequently occurring values represented in fewer bits. However, other encoding techniques may be implemented accordingly to meet the design criteria of a particular implementation.

The inverse quantization circuit 184 and the inverse transform circuit 186 may be used to decode the encoded macroblocks. The summing block 188 may provide a mathematical operation to sum the decoded macroblocks with the predicted macroblocks to form reconstructed macroblocks. By reconstructing the macroblocks, the processing block 132 generally ensures that the prediction processing is based upon the same reference as would be available during decoding (e.g., reduces drift). The reconstructed macroblocks are generally stored in the picture memory 174. The filter block 173 may be configured to reduce or eliminate artifacts in the reconstructed picture from the use of macroblocks.

Figure 6:
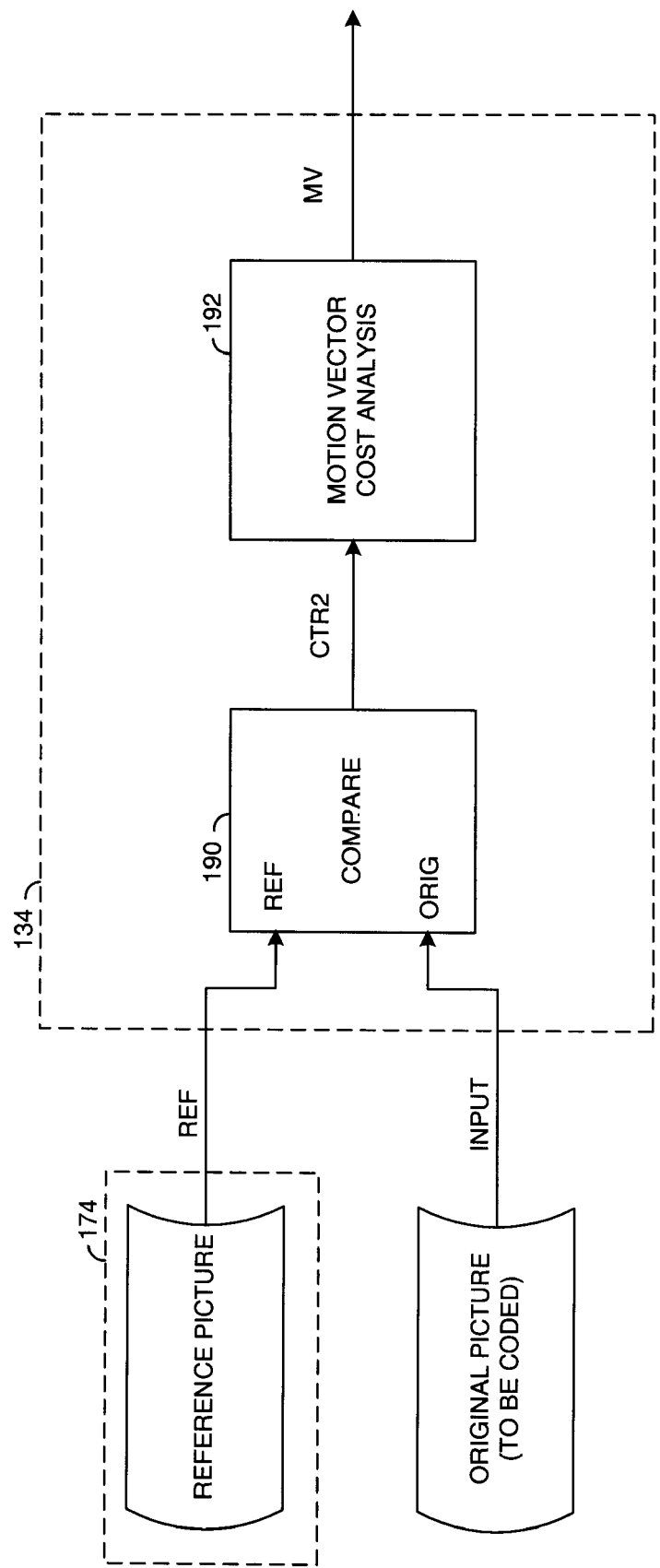
FIG. 6 is a more detailed block diagram of a motion estimation block of FIG. 5.

Referring to FIG. 6, a more detailed block diagram of the circuit 134 of FIG. 5 is shown. The circuit 134 generally receives (i) a current (or original) picture (e.g., to be coded) via the signal INPUT and (ii) a reference picture from the picture memory 174 via the signal REF. However, other numbers of reference pictures may be implemented accordingly to meet the design criteria of a particular application. The circuit 134 is generally configured to generate the signal MV in response to the reference picture and the original picture.

The circuit 134 may comprise a block (or circuit) 190 and a block (or circuit) 192. The circuit 190 may be implemented, in one example, as a compare block. The circuit 192 may be implemented, in one example, as a motion vector cost analysis circuit. The current picture may be presented to a first input of the circuit 190. The reference picture may be presented to a second input of the circuit 190. The circuit 190 may have an output that may present a signal (e.g., CTR2) to an input of the circuit 192. The signal CTR2 may comprise, in one example, a number of sums of absolute differences (SADs) generated in response to the comparison (e.g., a block-matching operation, etc.) of the current picture to the reference picture. The circuit 192 may have an output that may be configured to present the signal MV. The signal MV may comprise, in one example, a number of motion vectors. In the case where multiple reference pictured are supported, the signal MV may also comprise a number of reference indices (e.g., Refidx). The circuit 192 is generally configured to generate the signal MV in response to a cost-function analysis performed on the information within the signal CTR2. However, the block 190 and 192 may be configured to cooperate to reduce the number of comparisons performed.

The present invention may provide a computational optimization of motion estimation by incorporating an early exit scheme that may reduce the number of computations based upon a comparison of a partial cost measurement with a best-so-far cost. The comparison between the partial cost measurement and the best-so-far cost is most appropriate when the cost function is easily separable into two or more terms. For example, in motion estimation with a cost function of the form:

$$Cost=A+B,$$

a computational reduction may be realized by implementing a process summarized with the following pseudo-code:

```
for all search positions
{
    cost = A
    if (cost < best_cost)
    {
        cost = cost + B
        if (cost < best_cost)
        {
            best_cost = cost
        }
    }
}
```

The above process may be advantageous because when the first term (A) evaluates to a value greater than the best-so-far cost (e.g., the value best_cost), the computation of the second term (B) may be avoided. Furthermore, the order with which the search positions are evaluated may be set to increase the frequency with which the evaluation of the second term (B) may be statistically minimized.

The cost function used for block-matching motion estimation is generally based upon a measurement of distortion between the original block of pixels and the reference block of pixels. The measurement of distortion generally quantifies the difference between the block of pixels in the original picture and the block of pixels in the reference picture. In one example, the distortion measurement may comprise a Sum of Absolution Differences (SAD) between the original block of pixels and the reference block of pixels. However, other measures of distortion may be implemented accordingly to meet the design criteria of a particular application.

The cost estimate may also be based upon factors, other than the difference between the current block and the reference block, that can affect the rate and/or quality of the encoded video stream. For example, improved encoding performance may be achieved by incorporating a penalty related to an estimate of the number of bits used to encode prediction parameters (e.g., motion vectors, etc.) for the current block into the block-matching cost function. A cost function incorporating such a penalty may be expressed by the following equation:

$$Cost(x,y)=MvCost(x,y)+SAD(x,y),$$

where MvCost represents the cost penalty related to encoding the prediction parameters (e.g., motion vectors).

In one example, the motion vector cost penalty for each search window may comprise a mathematical function of the absolute difference between the candidate motion vector and a dominant motion component associated with the search window. However, any other penalty based on a candidate motion vector and the dominant motion components or other information regarding motion of the current block may be used accordingly in the block matching cost function. For example, information may be obtained through a global motion estimation process that may be found in co-pending application U.S. Ser. No. 10/196,731, filed Jul. 17, 2002, which is hereby incorporated by reference in its entirety.

In one example, an encoder compliant with the H.264/MPEG4-AVC standard may incorporate the above equation in a motion estimation process that may be summarized by the following pseudo-code:

```
for all search positions
{
    cost = MvCost(curr_x, curr_y)
    if (cost < best_cost)
    {
        cost = cost + SAD(curr_x, curr_y)
        if (cost < best_cost)
        {
            best_cost = cost
        }
    }
}
```

The search order by which the for loop iterates through the search positions is generally a spiral starting with the (0,0) position. By implementing the spiral path, the MvCost term generally increases near-monotonically. As the search progresses, the MvCost generally increase and often becomes larger than the best-so-far cost term best_cost. When the MvCost term is larger than the best-so-far cost, the computation of the sum of absolute differences (SAD) may be avoided.

The present invention generally takes advantage of predetermined characteristics of the MvCost (motion vector cost) term of the above cost function to reduce the total computation performed for motion estimation. When the best-so-far total cost is smaller than the smallest value of MvCost for any of the remaining search positions, the present invention allows the search loop to be exited early, thereby avoiding further evaluation of the MvCost term and the SAD. An example of a process in accordance with the present invention may be summarized by the following pseudo-code:

```
for all search positions
{
    cost = MvCost(curr_x, curr_y)
    if (cost < best_cost)
    {
        cost = cost + SAD(curr_x, curr_y)
        if (cost < best_cost)
        {
            best_cost = cost
        }
    }
    else if (best_cost < minimum MvCost for remaining
    search positions)
    {
        exit loop
    }
}
```

Since the search positions may be ordered such that the value of MvCost increases substantially monotonically, the minimum future value of MvCost may be easily estimated from the current value of MvCost. For example, a spiral search path may be implemented along which the value of the MvCost term at any position is generally no more than double the value of the MvCost term at any future position. When the value of the MvCost term at any position is generally no more than double the value of the MvCost term at any future position, a motion estimation process implemented in accordance with the present invention may be summarized by the following pseudo-code:

```
for all search positions
{
    cost = MvCost(curr_x, curr_y)
    if (cost < best_cost)
    {
        ...
    }
    else if (best_cost < cost / 2)
    {
        exit loop
    }
}
```

Although the present invention has been illustrated in the context of a cost function in a motion estimation process, the present invention is equally applicable to any search method where a lower bound on future values of a term of a cost function may be calculated from a current value of the term.

Figure 7:
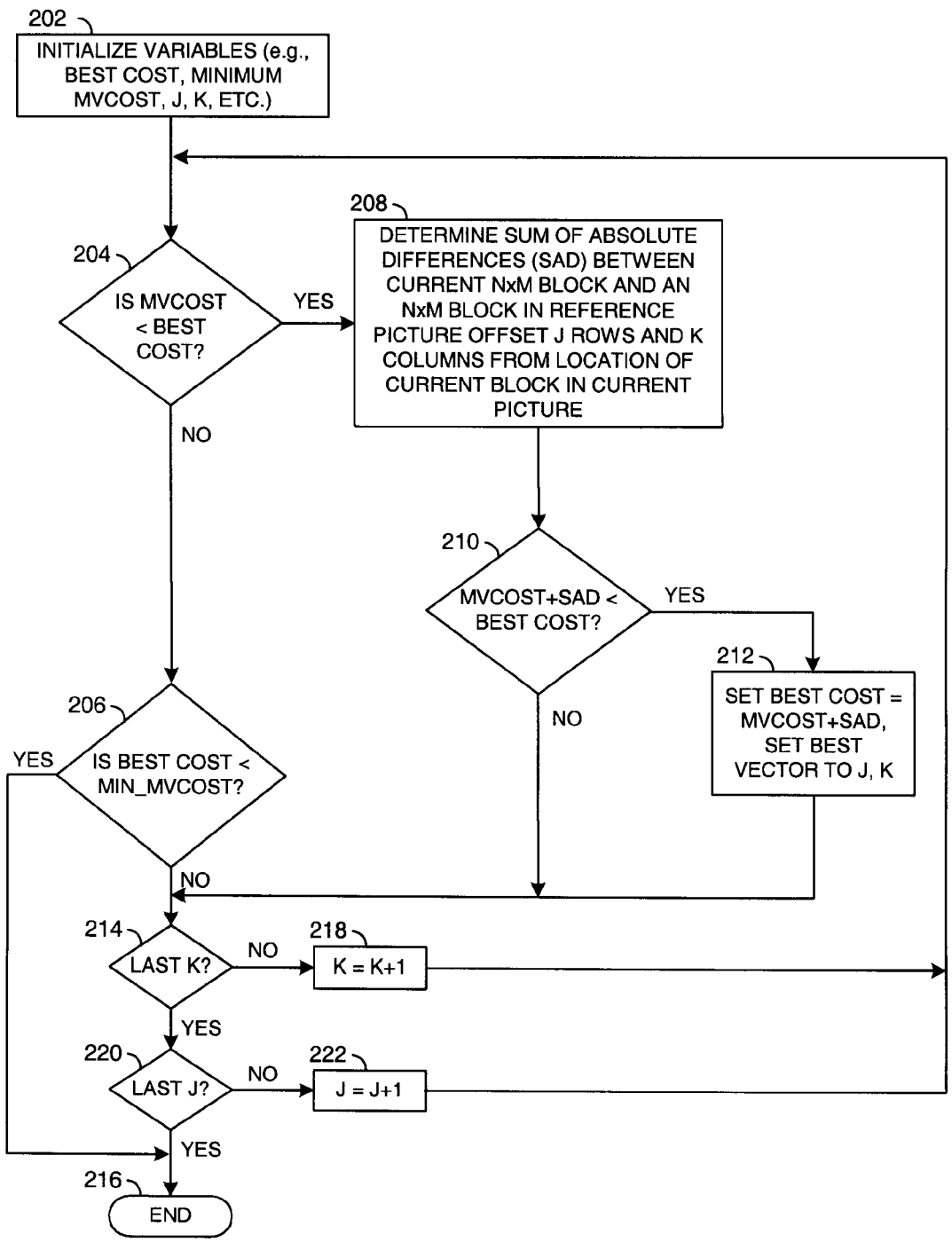
FIG. 7 is a flow diagram illustrating a motion estimation operation in accordance with a preferred embodiment of the present invention.

Referring to FIG. 7, a flow diagram 200 is shown illustrating a motion estimation process in accordance with a preferred embodiment of the present invention. In one example, the process 200 may begin by initializing a number of variables (e.g., the block 202). The variables may include, in one example, a best cost variable (e.g., BEST COST), a minimum motion vector cost penalty (e.g., MIN_MVCOST) and a vector (e.g., J,K), where J and K are integers. The values J and K may be used as indices for an iterative process for determining a best vector offset. The values J and K may be varied through a predetermined range. In one example, J and K may vary from a value of negative 31 to a value of positive 31. However, other ranges of J and K may be implemented accordingly to meet the design criteria of a particular implementation.

The cost penalty for the motion vector between a current block of pixels and a reference block of pixels (e.g., MVCOST) may be compared to the current best-so-far-cost BEST COST (e.g., the block 204). When the best-so-far-cost is less than the cost penalty for encoding the motion vector (and/or other prediction parameters), the process 200 may move to a decision state 206. When the cost penalty for encoding the motion vector is less than the best-so-far-cost, the process 200 may be configured to determine a measurement of the distortion (e.g., a sum of absolute differences or SAD) between the current block and the reference block at the current search position (e.g., the block 208). For example, a N×M block may be implemented, where N and M are integers representing a motion compensated block size(e.g., any of the block sizes shown in FIG. 3) that may be interpreted by a video decoder. A reference N×M block in the reference picture is generally offset, by a number of rows determined by the value of J and a number of columns determined by the value of K, from the location of the current N×M block in the current picture.

The motion vector cost and the sum of absolute differences (or other distortion measurement) may be summed and compared to the best-so-far-cost BEST COST (e.g., the block 210). When the sum of the motion vector cost and the sum of differences is smaller than the value of best-so-far-cost, the value of the best-so-far-cost may be reset to the sum of the motion vector cost and the sum of differences and the coordinates for the best vector offset (e.g., J0,K0) set to the current J and K values (e.g., the block 212). Otherwise, the process 200 may move to a decision state 214.

In the decision state 206, the best-so-far-cost is generally compared to the minimum cost penalty for any remaining motion vectors of any remaining search positions. When the minimum motion vector cost penalty is less than the current best-so-far-cost, the process 200 generally moves to the decision state 214. When the current best-so-far-cost is less than the minimum motion vector cost penalty, the process 200 generally ends (e.g., the block 216).

In the state 214, the value of the variable K may be incremented until all of the range for K has been checked for each value of J (e.g., the blocks 214 and 218). Similarly, when all of the range of K has been checked for a particular value of J, the variable J may be incremented until all of the values in the range for J have been checked (e.g., the blocks 220 and 222). When the entire ranges of J and K have been checked, the process 200 generally ends (e.g., the block 216) and the determined best-so-far-cost (e.g., BEST COST) and best vector offset (e.g., J0,K0) are generally presented to a next stage.

The function performed by the flow diagram of FIG. 7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention. For example, the present invention is equally applicable to any search method and/or application where a lower bound on future values of a term of a cost function may be calculated from a current value of the term.

The invention claimed is:

1. A method for motion estimation comprising the steps of:
   (A) determining whether a cost of encoding one or more prediction parameters for a current search position is less than a current best cost;
   (B) when said cost of encoding said one or more prediction parameters for said current search position is less than said current best cost, updating said current best cost if said current best cost is greater than or equal to a sum of said cost for encoding said one or more prediction parameters for said current search position and a distortion measurement for said current search position; and
   (C) ending said search when said current best cost is less than or equal to said cost of encoding said one or more prediction parameters for said current search position and less than a minimum cost for encoding one or more prediction parameters for one or more remaining search positions.

2. The method according to claim 1, wherein said one or more prediction parameters comprise a motion vector.

3. The method according to claim 1, further comprising the steps of:
   determining a measurement of distortion between a current block and a reference block at said current search position; and
   determining whether a sum of (i) said cost of encoding said one or more prediction parameters for said current search position and (ii) said measurement of distortion between said current block and said reference block at said current search position is less than said current best cost.

4. The method according to claim 1, wherein said distortion measurement is determined using a sum of absolute differences between a current block and a reference block at said current search position.

5. The method according to claim 4, wherein updating said current best cost comprises:
   setting said current best cost equal to the sum of (i) said cost of encoding said one or more prediction parameters for said current search position and (ii) said distortion measurement between said current block and said reference block at said current search position.

6. The method according to claim 1, wherein said minimum cost for encoding said one or more prediction parameters of said one or more remaining search positions is determinable based on said cost of encoding said one or more prediction parameters for said current search position.

7. The method according to claim 6, wherein said minimum cost for encoding said one or more prediction parameters of said one or more remaining search positions is substantially equal to one-half the cost of encoding said one or more prediction parameters for said current search position.

8. The method according to claim 1, further comprising the step of:
   ordering said search positions such that the cost of encoding prediction parameters for each subsequent search position increases substantially monotonically.

9. The method according to claim 8, wherein:
   said search positions are ordered along a spiral search path.

10. An apparatus comprising:
    means for determining whether a cost of encoding one or more prediction parameters for a current search position in a reference picture is less than a current best cost;
    means for updating said current best cost if said current best cost is (i) greater than or equal to said cost of encoding one or more prediction parameters for a current search position and (ii) greater than or equal to a sum of said cost for encoding said one or more prediction parameters for said current search position and a distortion measurement for said current search position; and
    means for ending said search when said current best cost is (i) less than or equal to said cost of encoding said one or more prediction parameters for said current search position and (ii) less than a minimum cost for encoding one or more prediction parameters for one or more remaining search positions.

11. An apparatus comprising:
a first circuit configured to compare a first block of a current picture with each of a number of second blocks located at a number of search positions in a reference picture; and
a second circuit configured to determine whether a cost of encoding one or more prediction parameters for a current search position in said reference picture is less than a current best cost, wherein a motion estimation search is ended when said current best cost is (i) less than or equal to said cost of encoding said one or more prediction parameters for said current search position in said reference picture and (ii) less than a minimum cost for encoding one or more prediction parameters for one or more remaining search positions.

12. The apparatus according to claim 11, wherein said one or more prediction parameters comprise a motion vector.

13. The apparatus according to claim 11, wherein:
said first circuit is further configured to determine a measurement of distortion between said first block and a respective one of the second blocks at said current search position; and
said second circuit is further configured to update said current best cost if said current best cost is greater than or equal to a sum of (i) said cost of encoding said one or more prediction parameters for said current search position and (ii) said measurement of distortion between said first block and the respective second block at said current search position.

14. The apparatus according to claim 13, wherein said measurement of distortion between said first block and the respective second block comprises a sum of absolute differences.

15. The apparatus according to claim 13, wherein:
said second circuit is further configured to update said current best cost by setting said current best cost equal to said sum of (i) said cost of encoding said one or more prediction parameters for said current search position and (ii) said measurement of distortion between said first block and the respective second block at said current search position.

16. The apparatus according to claim 11, wherein said second circuit is further configured to determined said minimum cost for encoding said one or more prediction parameters of said one or more remaining search positions based upon said cost of encoding said one or more prediction parameters for said current search position.

17. The apparatus according to claim 11, wherein said minimum cost for encoding said one or more prediction parameters of said one or more remaining search positions is set equal to one-half the cost of encoding said one or more prediction parameters for said current search position.

18. The apparatus according to claim 11, wherein:
said first circuit is further configured to order said search positions such that the cost of encoding one or more prediction parameters for each search position increases substantially monotonically.

19. The apparatus according to claim 18, wherein:
said search positions are ordered along a spiral search path.

20. The apparatus according to claim 11, wherein said apparatus is part of an encoder that is compliant with the H.264/MPEG4-AVC compression standard.

* * * * *